United States Patent
Zhang et al.

(10) Patent No.: US 7,899,453 B2
(45) Date of Patent: Mar. 1, 2011

(54) SYSTEM AND METHOD FOR PROCESSING CALLS

(75) Inventors: Zhifeng Zhang, Shenzhen (CN); Chang Yi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 755 days.

(21) Appl. No.: 11/878,278

(22) Filed: Jul. 23, 2007

(65) Prior Publication Data

US 2008/0020777 A1 Jan. 24, 2008

Related U.S. Application Data

(63) Continuation of application No. PCT/CN2006/001354, filed on Jun. 16, 2006.

(30) Foreign Application Priority Data

Aug. 24, 2005 (CN) .................. 2005 1 0096916

(51) Int. Cl.
*H04W 4/00* (2009.01)
(52) U.S. Cl. .................. 455/432.1; 455/414.1; 455/411
(58) Field of Classification Search .................. 455/406, 455/410, 411, 412.1, 414.1, 432.3, 433, 435.1, 455/434, 445, 461, 432.1
See application file for complete search history.

(56) References Cited

U.S. PATENT DOCUMENTS

| | | | | |
|---|---|---|---|---|
| 5,815,808 A | * | 9/1998 | Valentine | .................. 455/422.1 |
| 5,854,982 A | * | 12/1998 | Chambers et al. | ........... 455/445 |
| 6,311,055 B1 | * | 10/2001 | Boltz | ...................... 455/414.1 |
| 6,643,511 B1 | * | 11/2003 | Hu et al. | ...................... 455/433 |
| 6,693,894 B1 | * | 2/2004 | Andersson et al. | .......... 370/352 |
| 7,035,239 B2 | * | 4/2006 | McCann et al. | ............. 370/335 |
| 7,190,959 B2 | * | 3/2007 | Palmer et al. | ............... 455/445 |
| 7,505,769 B2 | * | 3/2009 | Jiang | ........................ 455/432.3 |

(Continued)

FOREIGN PATENT DOCUMENTS

CN 1518383 A 8/2004

(Continued)

OTHER PUBLICATIONS

Written Opinion of the International Searching Authority (translation) dated (mailed) Sep. 7, 2006, issued in related Application No. PCT/CN2006/001354, filed Jun. 16, 2006, Huawei Technologies C., Ltd (5 pages).

(Continued)

*Primary Examiner*—Jean A Gelin
(74) *Attorney, Agent, or Firm*—Finnegan, Henderson, Farabow, Garrett & Dunner LLP (57) ABSTRACT

A system, a method for call processing and a device are provided. The device includes an IMSI and multiple MSISDN, wherein the multiple MSISDN includes a main-number and a sub-number, the sub-number is corresponding to an incoming call answering policy and an outgoing call number policy, and the device is capable of receiving an incoming call message carrying the sub-number and processing the incoming call message according to the incoming call policy corresponding to the sub-number and capable of configuring an outgoing call message according to the outgoing call number policy corresponding to the sub-number and sending the outgoing call message to a communication network.

17 Claims, 5 Drawing Sheets

U.S. PATENT DOCUMENTS

| | | | |
|---|---|---|---|
| 7,546,117 B2 * | 6/2009 | Lewis et al. | 455/418 |
| 7,577,431 B2 * | 8/2009 | Jiang | 455/432.1 |
| 2002/0004394 A1 * | 1/2002 | Tsai et al. | 455/432 |
| 2004/0242279 A1 | 12/2004 | Costanzo et al. | |
| 2005/0021592 A1 * | 1/2005 | Patel et al. | 709/200 |
| 2005/0075106 A1 * | 4/2005 | Jiang | 455/432.3 |
| 2005/0192035 A1 * | 9/2005 | Jiang | 455/461 |
| 2006/0111116 A1 * | 5/2006 | Palmer et al. | 455/445 |
| 2007/0191060 A1 * | 8/2007 | Baek | 455/558 |

FOREIGN PATENT DOCUMENTS

| | | |
|---|---|---|
| CN | 1525722 A | 9/2004 |
| CN | 1185894 C | 1/2005 |
| JP | 2003-134253 | 5/2003 |

OTHER PUBLICATIONS

First Chinese Office Action dated (mailed) Jan. 18, 2008, issued in related Chinese Application No. 200510096916.2 Huawei Technologies C., Ltd (18 pages), Partial.

Second Chinese Office Action dated (mailed) Jan. 16, 2009, issued in related Chinese Application No. 200510096916.2 Huawei Technologies C., Ltd (17 pages), Partial.

* cited by examiner

SYSTEM AND METHOD FOR PROCESSING CALLS

The present application is a continuation of PCT application PCT/CN2006/001354, filed on Jun. 16, 2006, entitled "CALL PROCESSING SYSTEM, DEVICE AND METHOD", which is incorporated by reference herein in its entirety.

FIELD OF THE INVENTION

The present invention relates to the communication field, and more particularly to a system, a device and a method for processing incoming calls and outgoing calls of users according to various communication policies.

BACKGROUND OF THE INVENTION

The rapid development of communication technology allows users to communicate with each other more and more conveniently. However, it brings users many disturbances at the same time. Thus, it is important for a user to avoid malicious calls and appropriately handle calls that he or she does not want to answer or inconvenient to answer so as to avoid being disturbed in life or work. On one hand, when receiving calls from other users, the user generally wants to distinguish identities of calling users and handle the calls with appropriate policies according to the identities. On the other hand, when calling other users, the user wants to take an appropriate outgoing call policy according to the identities of the called parties, such as shielding his own phone number. In the prior art, a single International Mobile Subscriber Identity (IMSI) multiple Mobile Subscriber International Service Digital Network Numbers (MSISDN) method, which supporting providing mobile communication device with multiple MSISDN using one IMSI, is utilized to avoid the user to be disturbed at will.

In a Chinese patent with application No. 01139102.2 and entitled "Apparatus and method for intelligently filtering disturbance of incoming call", a user may block an incoming call number according to the predetermined identity type of the calling number, so as to avoid being disturbed. However, the above patent is unable to provide an accurate filtering if the same contact initiates calls with a different calling number, and can only provide a single incoming call processing policy, which is difficult to meet the requirement of the user on processing different incoming calls with various policies.

In a Chinese patent with application No. 03137321.6 and entitled "A method and a communication network for realizing multiple-number service", the purpose of the service of single IMSI multiple MSISDN is achieved by modifying the signaling network. Calls of different numbers are permitted or not permitted to be connected according to the condition of the user. The solution requires a complex modification on the configuration of the existing communication networks, and has a single processing policy for different incoming calls and can not distinguish the identity types of corresponding calls coming from multiple numbers, which brings difficulty for users to flexibly handle different incoming calls.

In summary, the prior art fails to provide flexible answering policies according to the types of calling users. Meanwhile, when initiating a call to other users, the user is unable to take a corresponding outgoing call policy for different contacts to avoid privacy exposure.

SUMMARY OF THE INVENTION

A system for call processing, including:

at least one communication terminal with an IMSI and MSISDN, and a communication network, wherein the multiple MSISDN includes a main-number and a sub-number and the sub-number is corresponding to an incoming call answering policy and an outgoing call number policy;

the communication network is adapted to send to the communication terminal an incoming call message with the sub-number as called number, and send to a called terminal an outgoing call message configured by the communication terminal according to the outgoing call number policy;

the at least one communication terminal is adapted to receive the incoming call message and process the incoming call message according to the incoming call answering policy corresponding to the sub-number, and adapted to configure an outgoing call message according to the outgoing call number policy corresponding to the sub-number and send the outgoing call message to communication network.

A device with an IMSI and multiple MSISDN, wherein the multiple MSISDN includes a main-number and a sub-number and the sub-number is corresponding to an incoming call answering policy and an outgoing call number policy;

the device is capable of receiving an incoming call message carrying the sub-number and processing the incoming call message according to the incoming call policy corresponding to the sub-number and capable of configuring an outgoing call message according to the outgoing call number policy corresponding to the sub-number and sending the outgoing call message to a communication network.

A method for call processing, including:

receiving, by a communication terminal with an IMSI and multiple MSISDN, an incoming call message sent from a communication network, wherein the multiple MSISDN includes a main-number and a sub-number, the sub-number is corresponding to an incoming call answering policy, and the incoming call message carries the sub-number as called number;

processing the incoming call message according to the incoming call answering policy corresponding to the sub-number.

A method for call processing, including:

configuring, by a communication terminal with an IMSI and multiple MSISDN, a outgoing call message, wherein the multiple MSISDN includes a main-number and a sub-number, the sub-number is corresponding to an outgoing call number policy, and the outgoing call message is configured according to the outgoing call number policy corresponding to the sub-number; and sending the outgoing call message to the communication network.

In the present invention, the sub-number function is added on the basis of the existing communication network and communication terminals, thus achieving incoming call grouping and outgoing call grouping. The present invention is easy to be implemented and have good compatibility, and can provide users much more personalized communication services and avoid privacy exposure.

DETAILED DESCRIPTION OF THE INVENTION

To make the objects, solutions and advantages of the present invention more apparent, the present invention will be described in detail with the accompanying drawings and embodiments. It should be appreciated that the specific embodiments described herein are for the purpose of illustration but not to limit the present invention.

In the present invention, by utilizing an existing communication network, a sub-number function is added on the basis of existing communication protocols. Corresponding incoming call answering policies and outgoing call number communication policies are configured for different sub-numbers.

An implementation of an embodiment of the present invention in a GSM system is, exemplarily described as follows.

Figure 1:
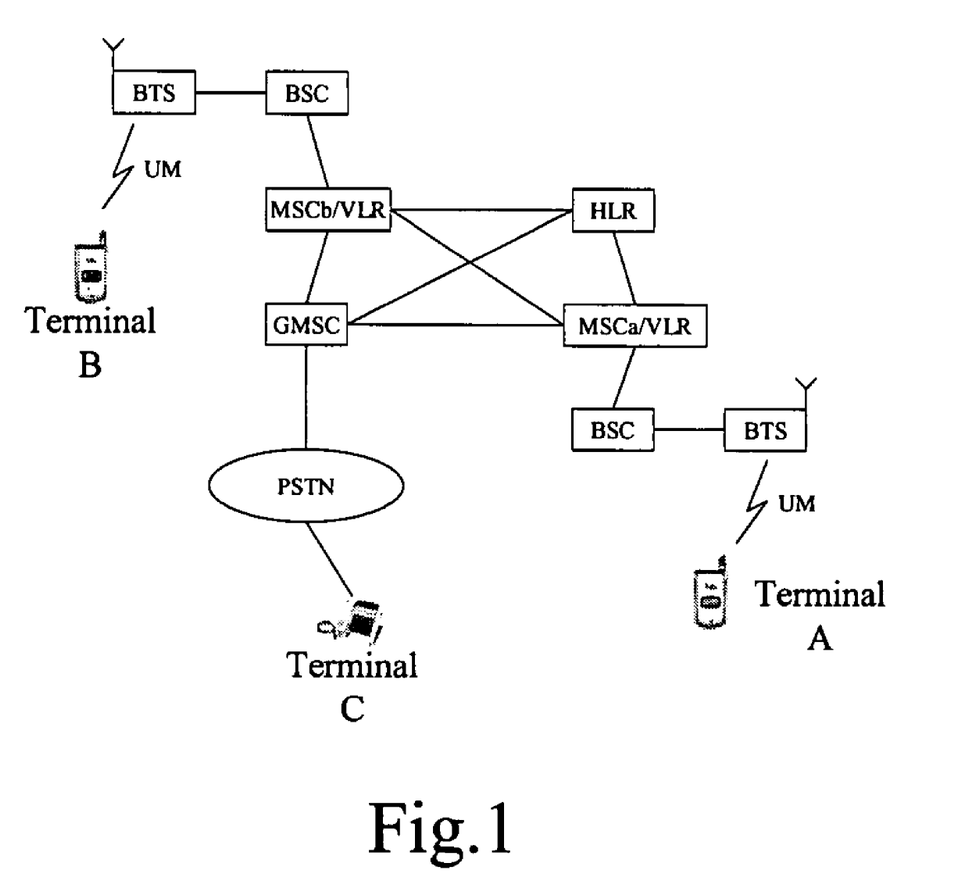
FIG. 1 is a structure diagram illustrating a GSM network system applicable to an embodiment of the present invention.

FIG. 1 shows a network structure diagram of a GSM system in which an embodiment of the present invention is implemented. Terminal A and Terminal B are mobile stations. They access to the network system via a UM interface and then via a Base Transceiver Station (BTS) and a Base Station Controller (BSC), respectively. Terminal C is a fixed telephone, which usually has functions such as caller identification display or voice prompt. And terminal C connects to a Gateway Mobile Switching Center (GSMC) via a Public Switching Telephone Network (PSTN). Terminals B or C initiates a call request to Terminal A via the network or receives a call request initiated by Terminal A.

Terminal A applies to the operator for activating multiple MSISDN. In other words, Terminal A subscribes a service of single IMSI multiple MSISDN in a Home Location Register (HLR). Among the multiple MSISDN, one is the main-number and the others are sub-numbers. Information of the main-number and the relevant sub-numbers are registered and stored in the HLR. When the location of the user is updated, the main-number and the sub-numbers are all added into a Visitor Location Register (VLR).

A Mobile service Switching Center (MSC) performs basic switching functions and implements communication connections between Terminal A and Terminal B, or Terminal A and Terminal C. As to be described below, in an embodiment of the present invention, when Terminal B calls a sub-number of Terminal A, the MSC may fill the main-number of Terminal A returned by the HLR into an Initial Address Message (IAM). When Terminal A calls Terminal B or returns a call answer to Terminal B, the MSC extracts information of the corresponding sub-number of Terminal A and delivers the information to Terminal B.

Figure 2:
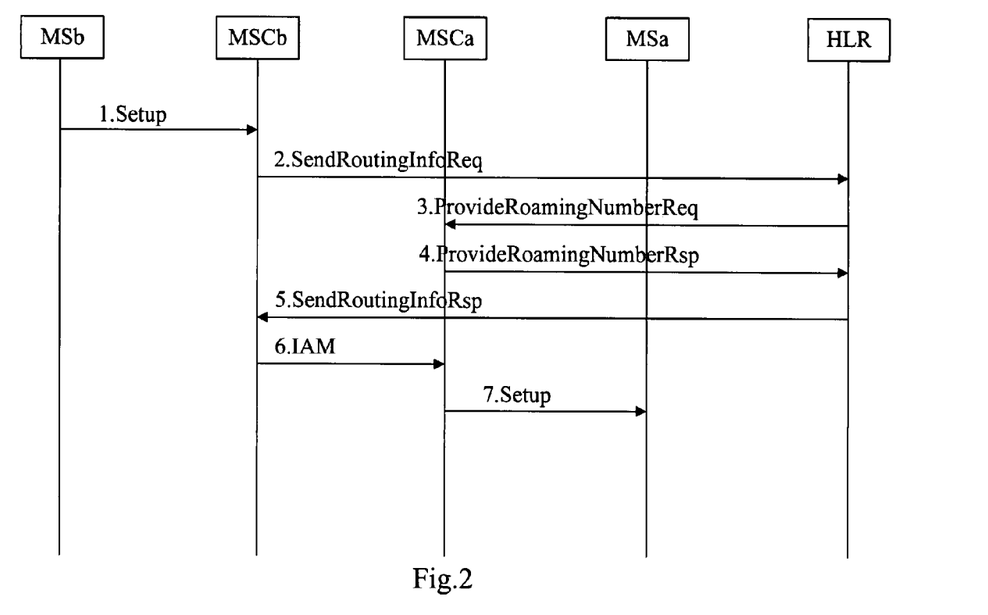
FIG. 2 is a flow chart illustrating how Mobile Station b (MSb) calls Mobile Station a (MSa) which has a sub-number function according to an embodiment of the present invention.

In an embodiment of the present invention, Terminal B initiates a call to Terminal A, with a sub-number of Terminal A as the called number and the number of Terminal B as the calling number. FIG. 2 shows a signaling processing flow when Terminal B initiates a call to Terminal A as follows:

1. MSb (referred as Terminal B) sends a SETUP message to Mobile service Switching Center b (MSCb), with a sub-number of Terminal A as the called number in the message;

2. MSCb initiates a SendRoutingInfoReq message to HLR according to the sub-number of Terminal A in the SETUP message;

3. HLR initiates a ProvideRoamingNumberReq message to MSCa;

4. Mobile service Switching Center a (MSCa) returns a ProvideRoamingNumberRsp message, which includes, or carries, a roaming number, to HLR;

5. HLR returns a SendRoutingInfoRsp message to MSCb. The SendRoutingInfoRsp message includes the roaming number and supplementary service data of the supplementary service, i.e., single IMSI multiple MSISDN, that the user terminal A subscribes;

6. MSCb sends an IAM to MSCa. The MSCb indicates that the calling number is the number of Terminal B, the original called number is the sub-number of Terminal A and the called number is the roaming number, according to the fact that the user of Terminal A is a subscriber of the service of single IMSI multiple MSISDN;

7. After receiving the IAM message, MSCa initiates a call to MSb by issues a SETUP message, and in SETUP message, the calling number is the number of Terminal B and the called number is the sub-number of Terminal A. When MSa (referred as Terminal A) receives the SETUP message, the displayed number on MSa is the number of Terminal B.

In the above description, the format of the IAM message sent from MSCb to MSCa is shown in ITU Q.763, which is referenced herein. As shown in the table below, the IAM message includes at least:

Called party number, containing information of the main-number of Terminal A;

Calling party number, containing information of the number of Terminal B;

Original called number, containing information of the sub-number of terminal A;

| Parameter | Type | Length(octet) |
|---|---|---|
| ... | ... | ... |
| Called party number | V | 4-11 |
| ... | ... | ... |
| Calling party number | O | 4-12 |
| ... | ... | ... |
| Original called number | O | 4-12 |
| ... | ... | ... |

In the above table, the "O" type means optional parameter and the "V" type means mandatory variable length parameter.

The format of the "Original called number" is as follows:

| | 8 | 7 | 6 | 5 | 4 | 3 | 2 | 1 |
|---|---|---|---|---|---|---|---|---|
| 1 | Odd/Even indicator | | | Nature of Address indicator | | | | |
| 2 | spare | Numbering plan indicator | | | Address presentation indicator | | | spare |
| | Second address signal of sub-number of Terminal A | | | | First address signal of sub-number of Terminal A | | | |
| ... | | | | | ... | | | |
| n | Filler | | | | $N^{th}$ address signal of sub-number of Terminal A | | | |

The format of the SETUP message sent from MSCa to MSa is as follows:

| Cell ID | Cell | Optional or not | Length |
|---------|------|-----------------|--------|
| ... | ... | ... | ... |
| 5C | Calling party BCD number | O | 3-14 |
| ... | ... | ... | ... |
| 6D | Called party sub-address | O | 2-23 |
| ... | ... | ... | ... |

In the above format, the "Calling party BCD number" includes the number of Terminal B and the "Called party sub-address" includes the sub-number of Terminal A. The format of the sub-number of Terminal A is as follows:

| 8 | 7 | 6 | 5 | 4 | 3 | 2 | 1 |
|---|---|---|---|---|---|---|---|
| | | | | Cell ID | | | |
| | | | | Length | | | |
| To be extended | Type of sub-address | | Odd/Even indicator | | 0 | 0 | 0 |
| | | | Start of Sub-number of Terminal A | | | | |
| | | | ... | | | | |
| | | | End of Sub-number of Terminal A | | | | |

Figure 3:
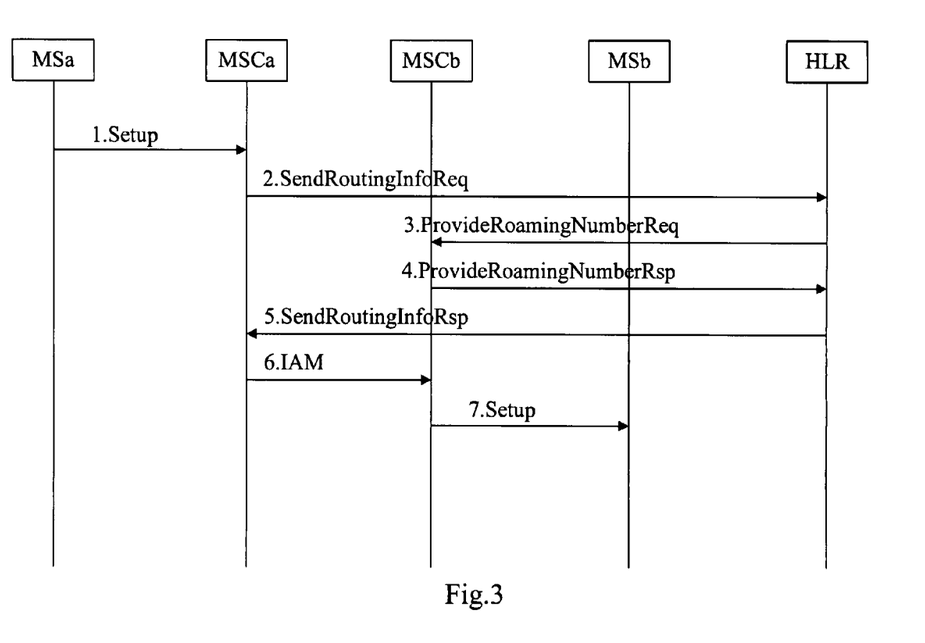
FIG. 3 is a flow chart illustrating how MSa which has a sub-number function calls MS b according to an embodiment of the present invention.

According to another embodiment of the present invention, when Terminal A calls Terminal B or calls back to Terminal B, the call processing flow is as shown in FIG. 3:

1. MSa sends a SETUP message to MSCa, with the number of Terminal B as the called number and the corresponding sub-number of Terminal A as the calling party sub-address in the SETUP message. If Terminal A calls back Terminal B, the calling party sub-address is the sub-number used during Terminal B calls Terminal A. If Terminal B is a new called user, the calling party sub-address is a sub-number preset by Terminal A according to a calling policy. When receiving the SETUP message, MSCa extracts the called number, that is, the number of Terminal B, and the calling party sub-address from the SETUP message. MSCa queries VLR according to an IMSI of Terminal A to obtain the main-number and all the sub-numbers of Terminal A;

2. MSCa sends a SendRoutingInfoReq message to HLR according to the number of Terminal B;

3. HLR initiates a ProvidingRoamingNumberReq message to MSCb;

4. MSCb returns a ProvideRoamingNumberRsp message which contains a roaming number of Terminal B to HLR;

5. HLR returns a SendRoutingInfoRsp message which contains the roaming number of Terminal B to MSCa;

6. MSCa sends an IAM to MSCb, wherein the calling number is the sub-number of Terminal A and the called number is the roaming number of Terminal B;

7. After receiving the IAM message, MSCb initiates a call to MSb by issuing a SETUP message, in which the calling number is the sub-number of Terminal A; when MSb receives the SETUP message, the displayed calling number on MSb is the corresponding sub-number of Terminal A.

The format of the SETUP message sent from MSa to MSCa is as follows:

| Cell ID | Cell | Optional or not | Length |
|---------|------|-----------------|--------|
| | ... | | |
| 6D | Calling party sub-address | O | 2-23 |
| | ... | | |

In the above table, the "Calling party sub-address" includes the sub-number used when Terminal A calls back. The format of the sub-number of Terminal A is as follows:

| 8 | 7 | 6 | 5 | 4 | 3 | 2 | 1 |
|---|---|---|---|---|---|---|---|
| | | | | Cell ID | | | |
| | | | | Length | | | |
| To be extended | Type of sub-address | | Odd/Even indicator | | 0 | 0 | 0 |
| | | | Start of Sub-number of Terminal A | | | | |
| | | | ... | | | | |
| | | | End of Sub-number of Terminal A | | | | |

Figure 4:
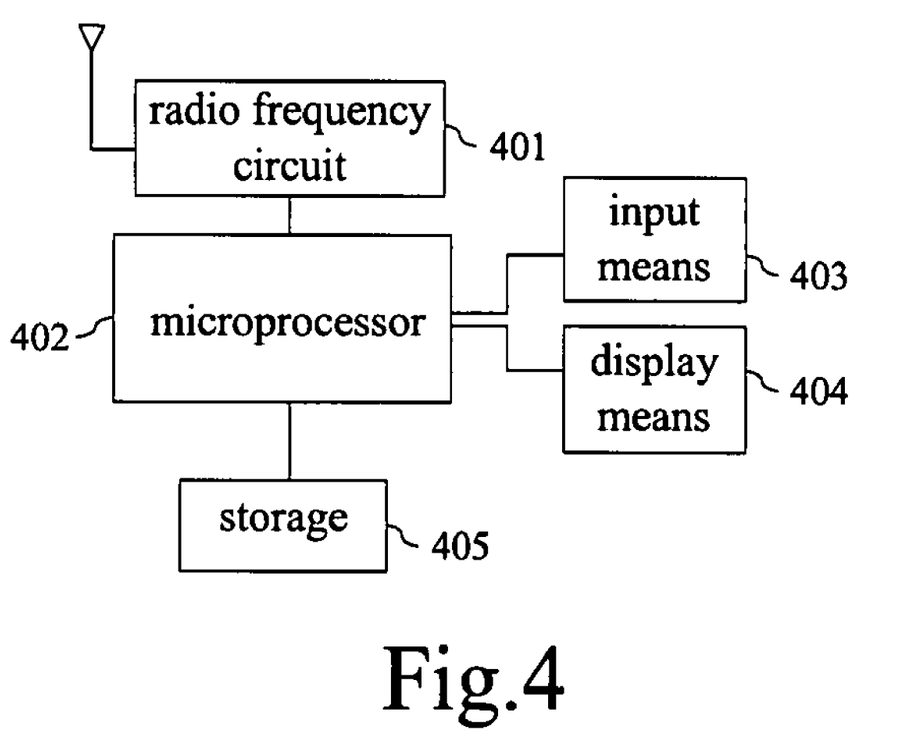
FIG. 4 is a typical structure diagram of a mobile terminal.

FIG. 4 shows a preferred structure of MSa. A radio frequency circuit 401 is adapted to receive signals, such as control signal and data signal, from a BTS and transmit transmission signals to the BTS. A microprocessor 402 is adapted to process the transmitting and receiving operations, and control an input means 403, a display means 404 and a storage unit 405. The input means 403 is adapted for a user to input an operation instruction or dial a number. The display means 404 displays the process and the result of the user's operation.

Figure 5:
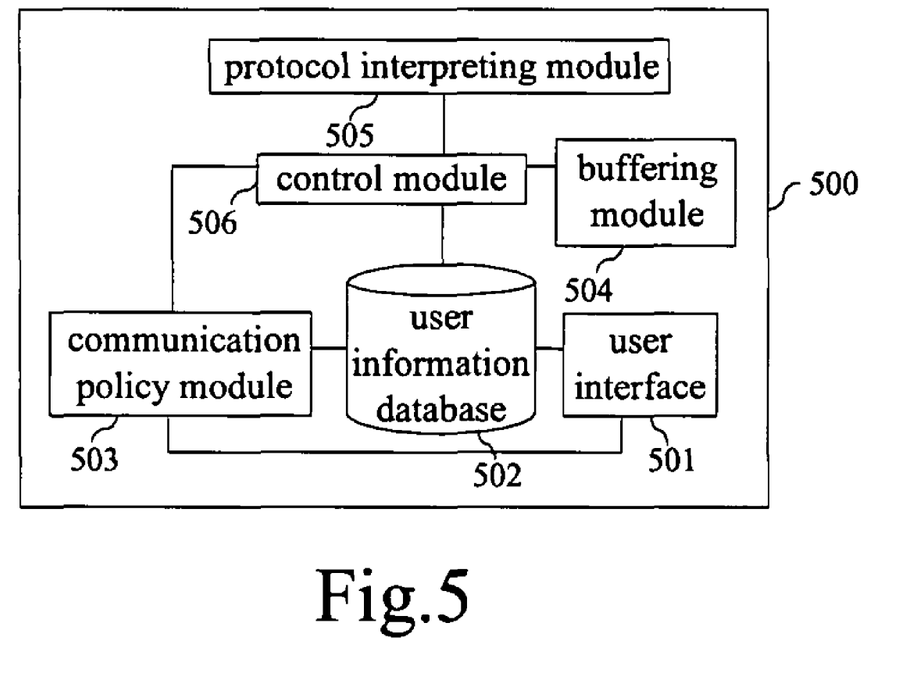
FIG. 5 is a structure diagram illustrating a system supporting incoming call grouping and outgoing call grouping in a mobile terminal according to an embodiment of the present invention.

The storage unit 405 provides a storage function. According to an embodiment of the present invention, a call processing module 500 may be set in the storage unit 405.

As shown in FIG. 5, the call processing module 500 includes a user interface 501, a user information database 502, a communication policy module 503, a buffering module 504, a protocol interpreting module 505 and a control module 506.

By means of an operation menu provided by the user interface 501, a user inputs information or performs various operations through the input means 403. And the results of the operations is displayed to the user by the user interface 501. The user enters contacts information into the user information database 502 via the user interface 501, and configures corresponding communication policies for different contacts by invoking the communication policy module 503.

Information of contacts corresponding to different sub-numbers, including name, phone number, identity type and corresponding sub-number of the contacts, are stored in the user information database 502. To achieve incoming call grouping and outgoing call grouping, each sub-number corresponds to an identity group and each identity group contains a communication list of the contacts with the same identity type. One contact may only know the sub-numbers corresponding to his own identity type. An example is shown as follows:

| Main-number Sub-number | | | Number 1 Number 4 | | |
|---|---|---|---|---|---|
| | Number 2 | Number 3 | | Number 5 | Number 6 |
| Identity type | Family | Colleague | Client | Stranger | Blacklist |
| Communication list | Contact A, Number 0001 | Contact B, Number 0002 | Contact C, Number 0003 | Contact D, Number 0004 | Contact E, Number 0005 |
| | ... | ... | ... | ... | ... |

The communication policy module 503 is adapted to set corresponding incoming call answering policies or outgoing call number policies for contacts with different identity types. The incoming call answering policies include answering, refusing to answer, sending a call prompt such as a voice or message prompt to the calling party when it is inconvenient to answer, activating the calling terminal to execute vibration in a corresponding form, or driving an embedded module or a peripheral device such as a video cam or a sound recorder in the calling terminal to execute call response operations, such as taking video or recording voice. The outgoing call number policies include sending different sub-numbers or shielding the calling number when it is inconvenient to let the called party know the calling number.

Preferred incoming call answering policies and outgoing call number policies are illustrated as follows:

mine the identity type of Terminal B; if there is no identity information of Terminal B in the user information database 502, the control module 506 extracts phone numbers of history incoming call and the corresponding sub-numbers from the buffering module 504, to determine the identity type of Terminal B; if it is still unable to find the identity information of Terminal B, the control module 506 assigns Terminal B a corresponding identity type in a default way. After the identity type of the called party is determined, a corresponding sub-number is chosen and put into the buffering module 504 temporarily according to an outgoing call number policy preset by the communication policy module 503. The protocol interpreting module 505 adds the sub-number into the calling party sub-address of the SETUP message and appends other relevant cells to construct a complete SETUP message. The control module 506 sends the SETUP message to the

| Sub-number Identity type | Number 2 Family | Number 3 Colleague | Number 4 Client | Number 5 Stranger | Number 6 Blacklist |
|---|---|---|---|---|---|
| Incoming call answering policy | Keep connected in 24 hours | Keep connected from 8:00 to 22:00, and send a voice prompt of "In rest, please leave a message or send a short message" at other time | Send a voice prompt of "In rest, please leave a message or send a short message" from 23:00 to 7:00; Keep connected at other time | Play a voice prompt of "Please call me on days off" | Send a prompt of refusing to be connected for busy network or power-off |
| Outgoing call number policy | Send a sub-number 2 to the opposite party | Send a sub-number 3 to the opposite party | Send a sub-number 4 to the opposite party | Send a sub-number 5 to the opposite party | Shield the number |

The buffering module 504 is adapted to buffer various relevant data including but not limited to messages and signals received from the BTS via the Um interface, and history information extracted by the protocol interpreting module 505, such as calling number, sub-number, calling time and call duration, etc.

When Terminal A receives the SETUP message from MSCa via the Um interface, the buffering module 504 buffers the message, and the control module 506 invokes the protocol interpreting module 505 to decode the message. According to the format of SETUP message, the protocol interpreting module 505 finds out the data with a cell identification of 5C, that is, find out the "Calling party BCD number" with a cell identification of 5C, and extracts the number of Terminal B; similarly, the protocol interpreting module 505 finds out the data with a cell identification of 6D, that is, find out the "Called party sub-address" with a cell identification of 6D, and extracts the sub-number of Terminal A. Thus, the protocol interpreting module 505 separates the calling number and the sub-number called by Terminal B from data stream of the SETUP message. The decoded information is buffered into the buffering module 504.

The control module 506 queries the user information database 502 according to the sub-number to determine the identity type of Terminal B, and calls back to Terminal B according to the incoming call answering policy corresponding to the identity type set by the communication policy module 503.

When Terminal A initiates a call to Terminal B, the call may be a call initiated from Terminal A to Terminal B or a call responded from Terminal A to Terminal B. The control module 506 queries the user information database 502 to deter- BTS, and further sends the SETUP message to the MSC. When Terminal B receives the calling request, the displayed calling number is the corresponding sub-number of Terminal A or is blank when Terminal A shields his own number. Thus, the outgoing call grouping is achieved for Terminal A.

It should be noted that, GSM system is only an exemplary system where the present invention is implemented. The present invention is also applicable to other communication systems, such as Code Division Multiple Access (CDMA) system and Public Switched Telephone Network (PSTN), which will not be described herein. Also, the terminals for incoming and outgoing call grouping services provided in the embodiments of the present invention are not limited to mobile terminals and may be fixed telephones or other communication terminals.

To be more readily understood, exemplary applications of the present invention are described as follows.

A user AAA has a main-number of 13800000000 and four sub-numbers of 1111, 2222, 3333 and 4444. AAA informs different contacts of those sub-numbers after grouping the sub-numbers as desired. The grouping is as follows:

| Main-number | | 13800000000 | | |
|---|---|---|---|---|
| Sub-number | 1111 | 2222 | 3333 | 4444 |
| Identity type | Family | Very Important Person (VIP) | Colleague | Stranger |
| Communication list | Wife, Number 8211111 ... | ... | DDD, Number 13663333333 ... | ... |

-continued

| | | | | |
|---|---|---|---|---|
| Incoming call answering policy | Answer | ... | ... | Prompt to leave a message |
| Outgoing call number policy | ... | ... | Send the number 3333 | ... |

Generally, when any one of the sub-numbers of 1111, 2222, 3333 and 4444 is called by a person, the mobile phone 13800000000 of AAA will ring. In other words, the four sub-numbers of 1111, 2222, 3333 and 4444 may be online at the same time. While ringing, the mobile phone of AAA will display the identity type of the calling party corresponding to a respective sub-number.

For example, when AAA's wife calls 1111 with the number of 8211111, the mobile phone of AAA will display "The wife user of 8211111 in the family group is calling, answer or not?" while ringing. Even if AAA's wife calls 1111 with a number of 288888 instead of 8211111, the mobile phone of AAA will display "An unknown user 288888 in the family group is calling, answer or not?" while ring. Therefore, AAA may know that the calling party belongs to his family according to the display of the mobile phone when AAA is called by the unknown phone number 288888 and may choose to answer the call.

Additionally, callback calls from AAA may also be grouped. For example, when AAA calls back to DDD after the colleague DDD calls 3333 with a number of 1363333333, the mobile phone of DDD will display that the incoming call number from AAA is 3333.

Since the user AAA sets the incoming call answering policy for the sub-number 4444 as leaving a message, when a person calls the number 4444, a prompt tone of "The owner is inconvenient to answer, please leave your message after hearing a beep" will be played to the person.

Though the present invention is described above with preferred embodiments, it is not limited to those embodiments. It is noted that all modifications, equivalent replacements and improvements made within the spirit and principle of the present invention shall fall into the protect scope of the present invention.

What is claimed is:

1. A system for call processing, comprising:
   a communication terminal with an International Mobile Subscriber Identity (IMSI) and multiple Mobile Subscriber International Service Digital Network Numbers (MSISDNs), and
   a communication network, wherein
   the multiple MSISDNs include a main-number and sub-numbers, each of the sub-numbers corresponding to an incoming call answering policy, outgoing call number policy, and an identity group, the identity group comprising a communication list of contacts of a same identity type;
   the communication network is adapted to send to the communication terminal an incoming call message with a first sub-number among the sub-numbers as a called number, and send to a called terminal an outgoing call message configured by the communication terminal, and
   the communication terminal is adapted to:
   receive the incoming call message and process the incoming call message according to the incoming call answering policy corresponding to the first sub-number, when the communication terminal receives a call request; and
   configure the outgoing call message according to the outgoing call number policy corresponding to a second sub-number among the sub-numbers when the communication terminal sends a call request or returns a call answer, and send the outgoing call message to the communication network, wherein the second sub-number corresponds to the called terminal and the called terminal is within the communication list.

2. The system according to claim 1, wherein the communication terminal comprises at least a storage unit, the storage unit comprises a call processing module, and the call processing module comprises: a user interface, adapted to provide an operation menu to a user, prompt the user to perform an information entering or call processing operation, and present a result of the information entering or call processing operation to the user; a user information database, adapted to store information of contacts corresponding to the sub-number; a communication policy module, adapted to configure the incoming call answering policy or the outgoing call number policy corresponding to the sub-number; a buffering module, adapted to buffer data; a protocol interpreting module, adapted to receive the incoming call message sent from the communication network, extract information of the sub-number in the incoming call message, or configure the outgoing call message according to the outgoing call number policy; a control module, adapted to process the protocol interpreting module to extract information of the sub-number from the incoming call message, query the communication policy module, and invoke the incoming call answering policy corresponding to the sub-number to process a call; and query the communication policy module, and control the protocol interpreting module to configure the outgoing call message according to the outgoing call number policy corresponding to the sub-number.

3. The system according to claim 1, wherein the communication network includes Mobile service Switching Center, Gateway Mobile Switching Center, Home Location Register and Visitor Location Register.

4. The system according to claim 1, wherein the main-number is mapped to the IMSI and the sub-numbers are mapped to the main-number.

5. A device, comprising:
   an IMSI: and
   multiple MSISDNs, wherein
   the multiple MSISDNs include a main-number and sub-numbers, each of the sub-numbers corresponding to an incoming call answering policy, an outgoing call number policy, and an identity group, the identity group comprising a communication list of contacts of a same identity type, and
   the device is capable of:
   receiving an incoming call message carrying a first sub-number among the sub-numbers and processing the incoming call message according to the incoming call policy corresponding to the first sub-number when the communication terminal receives a call request; and
   configuring an outgoing call message according to the outgoing call number policy corresponding to a second sub-number among the sub-numbers when the communication terminal sends a call request or returns a call answer to a called terminal, and sending the outgoing call message to a communication network, wherein the second sub-number corresponds to the called terminal and the called terminal is within the communication list.

6. The device according to claim 5, wherein device comprises at least a storage unit, the storage unit comprises a call processing module, and the call processing module comprises: a user interface, adapted to provide an operation menu to a user, prompt the user to perform an information entering or call processing operation, and present a result of the information entering or call processing operation to the user; a user information database, adapted to store information of contacts corresponding to the sub-number; a communication policy module, adapted to configure the incoming call answering policy or the outgoing call number policy corresponding to the sub-number; a buffering module, adapted to buffer data; a protocol interpreting module, adapted to receive the incoming call message sent from the communication network, extract information of the sub-number in the incoming call message, or configure the outgoing call message according to the outgoing call number policy; a control module, adapted to process the protocol interpreting module to extract information of the sub-number from the incoming call message, query the communication policy module, and invoke the incoming call answering policy corresponding to the sub-number to process a call; and query the communication policy module, and control the protocol interpreting module to configure the outgoing call message according to the outgoing call number policy corresponding to the sub-number.

7. The device according to claim 5, wherein the main-number is mapped to the IMSI and the sub-numbers are mapped to the main-number.

8. A method for call processing, comprising:
receiving, by a communication terminal with an IMSI and multiple MSISDNs, an incoming call message sent from a communication network, wherein the multiple MSISDNs include a main-number and sub-numbers, each of the sub-numbers corresponding to an incoming call answering policy, and an identity group, the identity group comprising a communication list of contacts of a same identity type, and the incoming call message carries one sub-number among the sub-numbers as called number;
processing the incoming call message according to the incoming call answering policy corresponding to the one sub-number.

9. The method according to claim 8, wherein the main-number is mapped to the IMSI and the sub-numbers are mapped to the main-number.

10. The method according to claim 8, wherein each of the sub-numbers corresponds to information of an identity type.

11. The method according to claim 8, wherein the incoming call answering policy comprises answering, refusing to answer, or sending a call prompt to a calling terminal.

12. The call processing method according to claim 8, wherein the outgoing call number policy comprises sending the sub-number corresponding to a called terminal or shielding a calling number.

13. A method for call processing, comprising:
configuring, by a communication terminal with an IMSI and multiple MSISDNs, an outgoing call message sent to a called terminal, wherein the multiple MSISDNs include a main-number and sub-numbers, each of the sub-numbers corresponding to an outgoing call number policy, and an identity group, the identity group comprising a communication list of contacts of a same identity type, and the outgoing call message is configured according to the outgoing call number policy corresponding to one sub-number among the sub-numbers, the one sub-number corresponding to the called terminal and the called terminal is within the communication list; and
sending the outgoing call message to the communication network.

14. The method according to claim 13, wherein the main-number is mapped to the IMSI and the sub-numbers are mapped to the main-number.

15. The method according to claim 13, wherein each of the sub-numbers corresponds to information of an identity type.

16. The method according to claim 13, wherein the incoming call answering policy comprises answering, refusing to answer, or sending a call prompt to a calling terminal.

17. The method according to claim 13, wherein the outgoing call number policy comprises sending the sub-number corresponding to a called terminal or shielding a calling number.

* * * * *